(12) United States Patent
Vandevelde et al.

(10) Patent No.: US 10,278,462 B2
(45) Date of Patent: May 7, 2019

(54) LUGGAGE ARTICLE FORMED OF A COMPACTED NON-WOVEN SHEET

(71) Applicant: Samsonite IP Holdings S.a r.l., Luxembourg (LU)

(72) Inventors: Mathieu Vandevelde, Spiere-Helkijn (BE); Pauline M. Koslowski, Berchem (BE)

(73) Assignee: Samsonite IP Holdings S.a r.l., Luxembourg (LU)

( * ) Notice: Subject to any disclaimer, the term of this patent is extended or adjusted under 35 U.S.C. 154(b) by 0 days.

(21) Appl. No.: 15/504,202

(22) PCT Filed: Aug. 18, 2015

(86) PCT No.: PCT/EP2015/068976
§ 371 (c)(1),
(2) Date: Feb. 15, 2017

(87) PCT Pub. No.: WO2016/026875
PCT Pub. Date: Feb. 25, 2016

(65) Prior Publication Data
US 2017/0265611 A1  Sep. 21, 2017

(30) Foreign Application Priority Data
Aug. 18, 2014 (EP) .................................. 14181313

(51) Int. Cl.
*A45C 5/02* (2006.01)
*B29C 70/46* (2006.01)
(Continued)

(52) U.S. Cl.
CPC .................. *A45C 5/02* (2013.01); *A45C 5/03* (2013.01); *B29C 51/145* (2013.01);
(Continued)

(58) Field of Classification Search
CPC ... A45C 2005/037; A45C 5/02; B29C 70/468; B29C 70/465; B29C 51/145
(Continued)

(56) References Cited

U.S. PATENT DOCUMENTS 3,534,852 A  10/1970  Posner
4,908,176 A   3/1990  Kato
(Continued)

FOREIGN PATENT DOCUMENTS

EP  0181470 A2  5/1986
EP  0305207 A2  3/1989
(Continued)

OTHER PUBLICATIONS

Extended European Search Report for corresponding European Patent Application No. 14181313.9 dated Jun. 30, 2015, 6 pages.
(Continued)

*Primary Examiner* — Sue A Weaver
(74) *Attorney, Agent, or Firm* — Dorsey & Whitney LLP (57) ABSTRACT

A luggage shell or case made from a sheet formed by compacting and heating a mat made of either a mixture of randomly oriented first discontinuous non-woven plastic fibers (42) having a first melting temperature and randomly oriented second discontinuous reinforcing non-woven plastic fiber (46) having a second melting temperature higher than the first melting temperature, or a bicomponent fiber having a first plastic portion having a first melting temperature and a second plastic portion having a second melting temperature. The non-woven mat is heated at a temperature between the first melting temperature and the second melting temperature, as well as by forming the compacted non-woven sheet (64) into the luggage shell.

20 Claims, 6 Drawing Sheets

(51) Int. Cl.
*B29C 51/14* (2006.01)
*B29L 31/00* (2006.01)
*B29K 105/08* (2006.01)
*A45C 5/03* (2006.01)

(52) U.S. Cl.
CPC ...... *B29C 70/465* (2013.01); *A45C 2005/037* (2013.01); *B29K 2105/0854* (2013.01); *B29L 2031/7418* (2013.01)

(58) Field of Classification Search
USPC .......................................... 190/125, 127, 40
See application file for complete search history.

(56) References Cited

U.S. PATENT DOCUMENTS

| | | | |
|---|---|---|---|
| 5,252,161 A * | 10/1993 | Chang | ..................... A45C 5/02 156/196 |
| 5,376,322 A | 12/1994 | Younessian | |
| 8,202,942 B2 | 6/2012 | Li et al. | |
| 2008/0261471 A1 | 10/2008 | Chen et al. | |
| 2011/0253152 A1 | 10/2011 | Lin et al. | |

FOREIGN PATENT DOCUMENTS

| | | |
|---|---|---|
| EP | 0531473 B1 | 7/1995 |
| EP | 2311629 A1 | 4/2011 |
| EP | 2576881 A2 | 12/2011 |
| EP | 2762295 A1 | 8/2014 |
| WO | 2011/148136 A2 | 12/2011 |

OTHER PUBLICATIONS

International Search Report and Written Opinion of International Patent Application No. PCT/EP2015/068976, dated Nov. 13, 2015, 9 pages.

* cited by examiner

LUGGAGE ARTICLE FORMED OF A COMPACTED NON-WOVEN SHEET

CROSS-REFERENCE TO RELATED APPLICATIONS

This application is the national stage application of International Patent Application No. PCT/EP2015/068976 filed on Aug. 18, 2015 and entitled "Luggage Article Formed of a Compacted Non-Woven Sheet" which claims priority to European Patent Application No. 14181313.9 filed on Aug. 18, 2014 and entitled "Luggage Article Formed of a Compacted Non-Woven Sheet, the entire contents of which are hereby incorporated by reference herein in their entireties.

FIELD OF THE INVENTION

The present invention relates to production of a luggage article and in particular producing a luggage shell from a non-woven material, including randomly oriented discontinuous reinforcing plastic fibers, and a process for manufacturing such a plastic component, in particular, a luggage shell.

BACKGROUND OF THE INVENTION

In the past, several attempts have been made to produce plastic components having high physical strength and resistance against breakage and distortion while rendering the component made of such synthetic resin lightweight and easy to recycle. In particular, in the luggage industry, there is a demand for producing hard shell suitcases combining the highest reliability and resistance against impact from outside with distortion-free behavior, favorable appearance, and reduced weight to allow such luggage to be handled with ease and convenience.

EP 0531473B1 provides a process and material in which an assembly of oriented polymeric fibers is maintained in intimate contact at an elevated temperature so that outer areas of the oriented polymeric fibers melt, and the fibers are subsequently compressed so as to produce a coherent polymer sheet. According to the method and material, the thermoplastic material of polyolefin, in particular, polypropylene or other crystalline or semi-crystalline materials, can be arranged as uni-axially aligned bundles or twisted bundles of fibers or as a woven mat of interwoven bundles depending on the later field of application.

From U.S. Pat. No. 5,376,322, a process of thermoforming, a cloth covered shape from a preform is known for producing luggage shells by pressure laminating a layer of cloth fabric to one surface of a thermoplastic substrate, which subsequently undergoes a press forming process in a mold press with a specific focus on the forming of the corner areas.

Also, U.S. Patent Publication No. 2008/0261471, entitled "Polyolefinic Materials for Plastic Composites," discloses woven polymeric fibers. One of the commercial woven fabrics is CURV®, which is made from polypropylene, and has high stiffness, high tensile strength and high impact resistance at low density. CURV® material is used for producing luggage shells, however it is very expensive. The problem with the woven fabrics is the complexity and cost of production.

Another method is to produce luggage shells from compression molding a plastic sheet, such as an acrylonitrile butadiene styrene (ABS) sheet. It is desirable to improve strength/reduce thickness of such luggage shells. Also, the luggage shell may be injection molded. However, injection molding requires expensive tooling.

Additional documents which disclose woven fibers and non-woven fibers are: U.S. Pat. No. 4,908,176, U.S. Pat. No. 8,202,942, U.S. Pat. Publication No. 2011/0253152, EP181470, EP2576881, and EP2311629. These proposals, however, may not be suitable for use in luggage items, or may be improved.

It is therefore desirable to provide an improved luggage construction, in particular an improved luggage, which addresses the above described problems and/or which more generally offers improvements or an alternative to existing sheet material structure and forming methods.

SUMMARY OF THE INVENTION

The present disclosure provides methods for producing, making, or forming articles, such as luggage shells or cases from non-woven material. The non-woven materials are strong, light weight, low cost, and are easy to form into products. The non-woven materials are also easy to recycle. The non-woven materials are engineered fabrics made from a web of randomly oriented discontinuous fibers. The fiber lengths may range from about 6.4 mm to about 250 mm. The discontinuous fibers are compacted to a large degree to form the article or shell, and may be held together by (1) mechanical bonding, i.e. mechanical locking in a random web or mat; or (2) thermal bonding, i.e. thermally fusing the fibers as in the case of a thermoplastic fiber as a matrix; or (3) chemical bonding, i.e. chemical bonding with a cementing medium, such as starch, casein, rubber latex, a cellulose derivative or synthetic resin. The non-woven materials are manufactured by high-speed, low-cost, large-volume processes rather than traditional woven processes. The non-woven material manufacturing process transforms fiber-based materials into flat, flexible, sheet structures with fabric-like surface characteristics which are formable into articles, such as luggage cases, having preferred strength, weight, and durability characteristics.

In an embodiment, a luggage shell may include a compacted non-woven sheet comprising randomly oriented discontinuous reinforcing plastic fiber bound by melting a randomly oriented discontinuous melting plastic fiber to form a polymer matrix. The reinforcing plastic fiber has a higher melting temperature than the plastic fiber.

In some embodiments, the luggage shell may also include a plastic film attached to the compacted non-woven sheet. In some embodiments, the luggage shell may also include a fabric lining attached to the compacted non-woven sheet. In some embodiments, the polymer matrix may include the same type of plastic as the discontinuous reinforcing plastic fiber.

In some embodiments, the polymer matrix is selected from a group consisting of copolyester, poly(ethylene terephthalate), polyamide, polypropylene, and polyethylene. In some embodiments, the discontinuous reinforcing plastic fiber is selected from a group consisting of copolyester, poly(ethylene terephthalate), polyamide, polypropylene, and polyethylene.

In some embodiments, the luggage shell may also include a plurality of non-woven mats. In some embodiments, the discontinuous reinforcing plastic fibers may be substantially uniformly distributed within the polymer matrix of the non-woven mat, and also in the compacted non-woven sheet.

In some embodiments, the compacted non-woven sheet may have a compacting factor from 70% to 100%, preferably from 85% to 100%. In some embodiments, the luggage shell may have a thickness ranging from 0.6 mm to 1.5 mm, preferably from 0.6 mm to 1.2 mm.

In some embodiments, the compacted non-woven sheet may have a weight ratio of the polymer matrix to the discontinuous reinforcing plastic fiber, the ratio ranging from 20% to 80%, preferably from 25% to 50%. In some embodiments, the discontinuous reinforcing plastic fiber may have a diameter ranging from 0.005 mm to 0.15 mm, and a length ranging from 6.4 mm to 250 mm.

In some embodiments, the shell may have a ratio of a depth dimension to a width dimension between about 0.1 and about 0.5, and/or a ratio of a length dimension to a width dimension between about 1 and about 2.

In some embodiments, a bicomponent fiber may include a core as the reinforcing plastic fiber and an outer layer as the melting plastic fiber. In some embodiments, the compacted non-woven sheet may include one or more deposited layers.

In an embodiment, a luggage shell having an inner and outer surface may include a non-woven mat including randomly oriented discontinuous reinforcing plastic fiber and randomly oriented discontinuous melting plastic fiber, the reinforcing plastic fiber having a higher melting temperature than the melted plastic fiber the melting plastic fiber defining a polymer matrix, the reinforcing plastic fiber bonded by the polymer matrix, and the non-woven mat being formed into a shell configuration.

In some embodiments, the luggage shell is formed by an individual non-woven mat including more than one, such as at least two deposited layers or regions, wherein a first deposited layer includes a higher weight percentage of reinforcing plastic fiber than melting plastic fiber and a second deposited layer includes a higher weight percentage of melting plastic fiber than reinforcing plastic fiber. In some embodiments, the first deposited layer is substantially entirely reinforcing plastic fiber and the second deposited layer is substantially entirely melting plastic fiber. In some embodiments the at least two deposited layers includes a plurality of deposited layers where the first deposited layer and the second deposited layer alternate repeatedly.

In another embodiment, the first deposited layer defines in part a portion of an inner surface of a luggage case and the second deposited layer defines in part a portion of an outer surface of the shell, the first deposited layer and the second deposited layer having different physical characteristics. In an embodiment the second deposited layer has about 35% by weight or greater of the melting plastic fiber and the outer surface has a relatively smooth surface texture. In an embodiment the first deposited layer includes about 15% by weight or less of the melting plastic fiber; and the inner surface has a relatively soft surface texture. In some embodiments at least one intermediate deposited layer is positioned between the first deposited layer and the second deposited layer, the intermediate deposited layer having a percent by weight of the melting plastic fiber different than the first or second layers.

In another embodiment, the non-woven mat has a thickness in the range of approximately 20-30 mm, and more preferably in a range of between 25-30 mm after thermal bonding; and in the range of approximately 1.5 to 10 mm, and more preferably approximately 5 mm after mechanical needling. In some embodiments the polymer matrix comprises the same type of plastic as the discontinuous reinforcing plastic fiber. In some embodiments the non-woven mat is heated and compressed to form a compacted non-woven sheet having a thickness in the range of approximately 0.6 to 2 mm, and preferably 0.6 to 1.5 mm.

In some embodiments the non-woven mat is formed at least in part by bicomponent fibers, each bicomponent fiber including a portion defining the reinforcing plastic fiber and a portion defining the melting plastic fiber. In an embodiment the non-woven mat is formed entirely of bicomponent fibers. In an embodiment, the reinforcing plastic fiber forms a core and the melting plastic fiber forming an outer layer surrounds the core.

The present disclosure provides methods for producing articles on the basis of non-woven materials or plastic fibers, the articles having a high degree of form change and including areas of high-grade deformation work; for example, deep-drawn luggage shells.

Moreover, the present disclosure provides a plastic component, in particular, a luggage shell, formed from non-woven plastic fibers allowing a considerable increase in the ratio of depth to length and/or width of such component so as to be able to support high loads or weights with a much-reduced or minimal net weight of the component.

Regarding the process aspects, according to the present disclosure, the plastic component or luggage shell is formed by a process having the product features as noted in the description.

In an embodiment, a method of fabricating a luggage shell may include compacting the non-woven sheet and thermoforming the compacted non-woven sheet into the luggage shell.

In an embodiment, a method of fabricating a luggage shell may include thermoforming a plurality of non-woven mats into the luggage shell.

In an embodiment, a method of fabricating a luggage shell may include heating a non-woven mat comprising the reinforcing plastic fiber and the plastic fiber to a processing temperature; and simultaneously compacting and molding the non-woven mat into the luggage shell.

In an embodiment, a method of fabricating a luggage shell may include heating a non-woven mat comprising the bicomponent fiber to a processing temperature; and simultaneously compacting and molding the non-woven mat into the luggage shell.

In an embodiment, a method of fabricating a luggage shell may include forming a non-woven mat comprising a mixture of randomly oriented first discontinuous plastic fiber having a first melting temperature and randomly oriented second discontinuous reinforcing plastic fiber having a second melting temperature higher than the first melting temperature. The method may also include compacting and heating the non-woven mat at a temperature between the first melting temperature and the second melting temperature to melt the first discontinuous plastic fibers to bind with the second discontinuous reinforcing plastic fibers. The method may further include forming a compacted non-woven sheet comprising the second randomly oriented discontinuous plastic fiber embedded in a polymer matrix formed from the melted first plastic fibers.

In some embodiments, the step of forming a non-woven mat may include randomly depositing at least a first layer of the first discontinuous plastic fiber; and randomly depositing at least a second layer of the second discontinuous reinforcing plastic fiber (46) over the at least first layer of the first discontinuous plastic fiber.

In some embodiments, the method may include thermoforming a luggage shell from the compacted non-woven sheet. In some embodiments, the method may also include thermoforming a luggage shell from a plurality of non-woven mats. In some embodiments, the method may include laminating a fabric lining to the compacted non-woven sheet. In some embodiments, the method may include laminating a plastic film to the compacted non-woven sheet. In some embodiments, the first discontinuous plastic fiber may be uniformly distributed in the second discontinuous reinforcing plastic fiber. In some embodiments, the first discontinuous plastic fiber may include the same plastic as the second discontinuous reinforcing plastic fiber. In some embodiments, each of the first discontinuous plastic fiber and second discontinuous reinforcing plastic fiber is selected from a group consisting of poly(ethylene terephthalate), polyamide, polypropylene, and polyethylene. In some embodiments, the second discontinuous reinforcing plastic fibers may be substantially uniformly distributed within the compacted non-woven sheet.

In an embodiment, a method of making the luggage shell may include providing a non-woven mat comprising the randomly oriented discontinuous reinforcing plastic fiber and the randomly oriented discontinuous melting plastic fiber. The method may also include compacting and heating the non-woven mat to form the compacted non-woven sheet. The method further may include molding the compacted non-woven sheet (64) to form the luggage shell.

In an embodiment, a method of making the luggage shell may include providing a non-woven mat comprising the randomly oriented discontinuous reinforcing plastic fiber and the randomly oriented discontinuous melting plastic fiber. The method may also include heating the non-woven mat. The method may further include simultaneously compacting and molding the non-woven mat to form the luggage shell.

Accordingly, the present disclosure provides a process which allows deep-drawing of compacted non-woven plastic mat or sheet, having randomly oriented discontinuous plastic fibers in a semi-crystalline thermoplastic matrix allowing the formation of very lightweight components, such as luggage shells, having areas of high-grade form change or corners.

In this way, components, in particular, luggage shells or composites thereof can be manufactured having substantially lower weight compared to conventional hard side luggage shells. In particular, compacted non-woven plastic mats or sheets are used to manufacture such components, in particular, shells by a press-forming technology designated also as "compressed tech" technology.

An aspect of the present disclosure includes forming a non-woven mat comprising a mixture of randomly oriented first discontinuous plastic fibers having a first melting temperature and randomly oriented second discontinuous reinforcing plastic fibers having a second melting temperature higher than the first melting temperature, compacting and heating the non-woven mat at a temperature between the first melting temperature and the second melting temperature to melt the first discontinuous plastic fibers to bind with the second discontinuous reinforcing plastic fibers, and forming a compacted non-woven sheet comprising the second randomly oriented discontinuous plastic fiber embedded in a polymer matrix formed from the melted first plastic fibers.

Prior to any shaping or molding process, the non-woven plastic fibers (lamina) may be combined with a thermoplastic film, preferably by heat-bonding in a continuous inactive process with the further press-forming of the desired plastic component.

The compacted non-woven sheet is stiff, impact resistant, light weight, and low cost. Advantageously, the compacted non-woven sheet described herein may significantly reduce the cost compared to woven fibers, such as self-reinforced propylene (SRPP). Also, the non-woven sheet may use recycled fibers.

Additionally, the compacted non-woven sheet may be thicker and/or stiffer than conventional SRPP such that less or no inner reinforcement structure is required for mounting carry handles, wheels, or extendable handles.

Additionally, the compacted non-woven sheet may create a surface finish having a soft touch, reducing the necessity of assembling an inner lining onto the shell.

Additionally, the compacted non-woven sheet may be compacted between 70% to 100% such that most of the air is pressed out to obtain a high impact resistance needed for the luggage shell.

In another example, a luggage shell component includes at least one non-woven mat made of randomly oriented discontinuous bicomponent plastic fiber having a first portion of a reinforcing plastic fiber and a second portion of a melting or melted plastic fiber, the reinforcing plastic fiber having a higher melting temperature than the melted plastic fiber; the melting or melted plastic fiber defining a polymer matrix; and the reinforcing plastic fiber bonded by, or embedded in, the polymer matrix. In an embodiment, the at least one non-woven mat includes at least one deposited layer; and the first portion is a greater percentage by weight than the second portion in the at least one deposited layer. In a further embodiment, within the first deposited layer the second portion is in the range of approximately 5% to 60% by weight. In another embodiment, within the first deposited layer, the first portion is about 75% by weight or greater and the second portion is about 25% by weight or less. In a further embodiment, within the first deposited layer the first portion is approximately 80% by weight. In an embodiment, the at least one non-woven mat including at least two deposited layers, wherein the first deposited layer includes a higher weight percentage of reinforcing plastic fiber than melting plastic fiber and a second layer includes a higher weight percentage of melting plastic fiber than reinforcing plastic fiber. In an additional embodiment, the at least one non-woven mat has a thickness of approximately 20 to 35 mm, after thermal bonding or approximately 1.5 to 10 mm after mechanical needling. In a further embodiment, the shell configuration of the non-woven mat is formed by a compaction step followed by a molding step, or by a combined compaction and molding step. Additionally, in an embodiment, the polymer matrix comprises the same type of plastic as the discontinuous reinforcing plastic fiber. In an embodiment, the shell component defines a wall thickness, and the wall thickness is in a range of approximately 0.4 to 3 mm, or in a range of approximately 0.6 to 1.5 mm. Additionally, in an embodiment, the compacted non-woven sheet (64) has a compacting factor from approximately 70% to 100%, or preferably from approximately 80% to approximately 100%. In an embodiment, at least one non-woven mat includes at least a second non-woven mat; and wherein said second non-woven mat includes randomly oriented discontinuous reinforcing plastic fiber and randomly oriented discontinuous melting plastic fiber, the reinforcing plastic fiber having a higher melting temperature than the melted plastic fiber.

In another example, a method of forming a luggage shell component, including a luggage shell composite, includes providing at least one non-woven mat, or a composite body thereof, the non-woven mat comprising at least one deposited layer of randomly oriented discontinuous reinforcing plastic fiber having a first weight percentage and a first melting temperature, and randomly oriented discontinuous melting plastic fiber having a second weight percentage and a second melting temperature lower than the first melting temperature, the non-woven mat interengaged and consolidated by thermal, mechanical or chemical bonding forming a luggage shell component by compacting and heating the at least one non-woven mat and molding the at least one non-woven mat, the forming occurring in a one-step process, or the forming occurring in a two-step process In a further embodiment, a luggage shell component as described herein and formed by the method described herein is frameless, and in another embodiment, a wheel assembly is directly attached to the shell. In a further embodiment, a portion of the luggage shell defines undulating convex and concave areas, and in another embodiment, the undulating convex and concave areas extend in a curved orientation relative to at least one peripheral edge of a wall of the luggage case.

Accordingly, the present disclosure allows the manufacturing of a very thin but durable, lightweight and distortion-resistant component, in particular, a luggage shell or luggage case, having areas of high degrees of form change, such as relatively sharply bent curves and bends, including corner areas of relatively small radius, without wrinkles being produced.

Additional embodiments and features are set forth in part in the description that follows, and will become apparent to those skilled in the art upon examination of the specification or may be learned by the practice of the disclosed subject matter. A further understanding of the nature and advantages of the present disclosure may be realized by reference to the remaining portions of the specification and the drawings, which forms a part of this disclosure. One of skill in the art will understand that each of the various aspects and features of the disclosure may advantageously be used separately in some instances, or in combination with other aspects and features of the disclosure in other instances.

BRIEF DESCRIPTION OF THE DRAWINGS

The description will be more fully understood with reference to the following figures, which are presented as various embodiments of the disclosure and should not be construed as a complete recitation of the scope of the disclosure, characterized in that.

DETAILED DESCRIPTION

The present disclosure provides, in one example, a process of making a highly durable, thin, and very lightweight plastic component, or composite thereof, in particular, a luggage shell or case, or portion thereof, from non-woven thermoplastic fibers in a cost-efficient manner. The process includes forming a non-woven mat including a single deposited layer or multilayers of fibers including randomly oriented plastic (or melting) fibers and reinforcing plastic fibers, which are in one example uniformly mixed. The non-woven mat may also include a single deposited layer of bicomponent fibers, where each of the bicomponent fibers includes a first portion having a melting point relatively higher than a second portion. In either case, the lower temperature fibers (or second portions of the bicomponent fibers) melt to form a matrix in which the reinforcing fibers (or first portions of the bicomponent fibers) are embedded and thus bonded together.

In one embodiment, the process includes simultaneously compacting and molding or shaping the non-woven to form a luggage shell. In this process, compacting and molding are combined in a single forming step.

In another embodiment, the process may include compacting the non-woven mat 40 to form a compacted non-woven sheet, and then forming a luggage shell by molding the compacted non-woven sheet.

One method to uniformly mix the two different fibers is provided below. The process may also include forming at least a first layer or mat made of randomly oriented first discontinuous fibers and forming at least a second layer or mat of randomly oriented second discontinuous fibers. The first layer is formed by depositing generally un-aligned or randomly oriented first fibers into a stack, and the second layer is formed by depositing generally un-aligned or randomly oriented second fibers into a stack. The mat of first discontinuous fibers and the mat of second discontinuous fibers are then heated and compacted, separately or together, into a sheet. The sheet is then formed into a component, such as a luggage shell.

Figure 1:
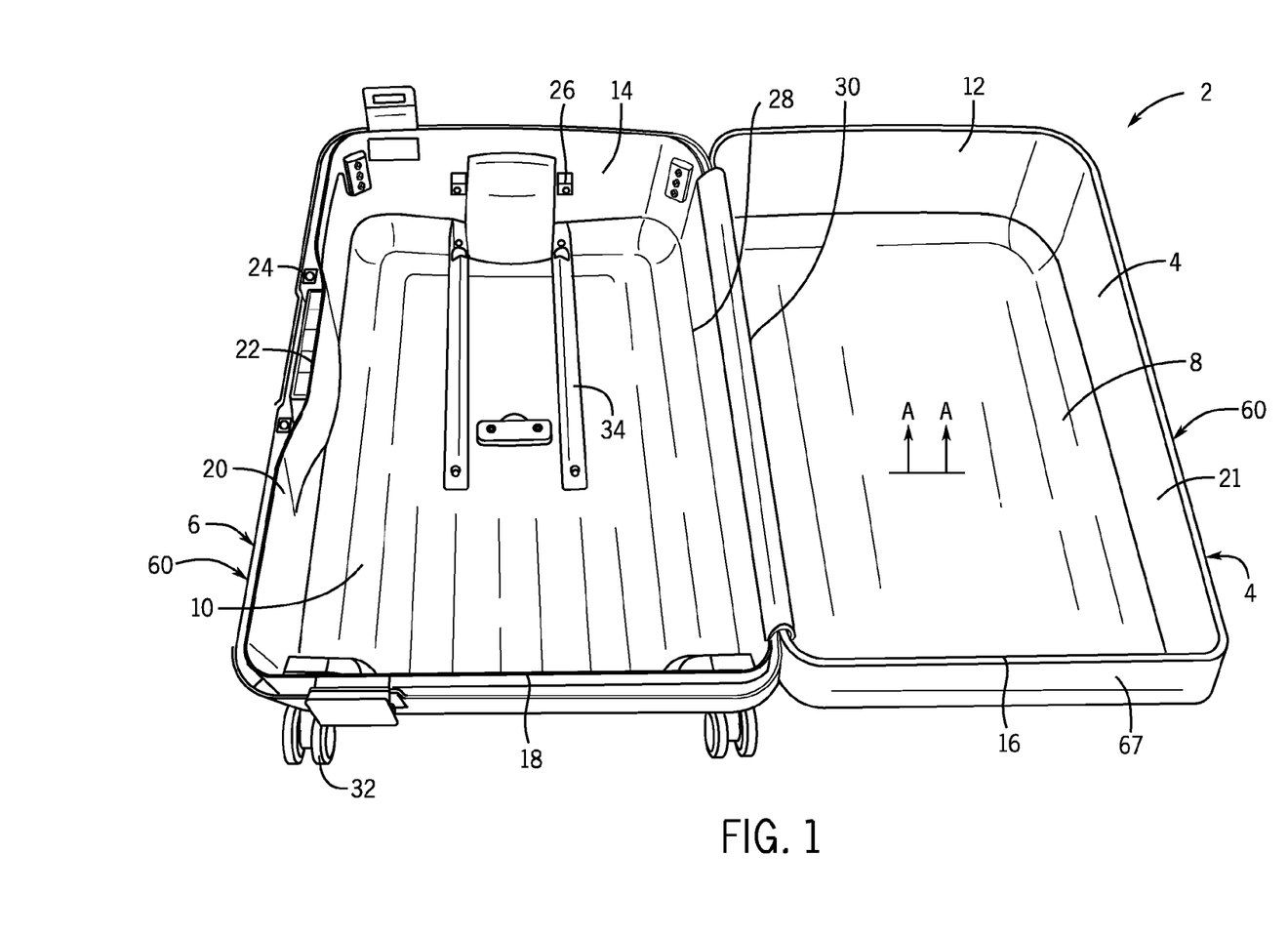
FIG. 1 is an isometric view of a luggage case having two opposing shell portions in accordance with embodiments of the present disclosure.

By way of example and without limitations, FIG. 1 shows a luggage case 2 including movably opposing shells in an open configuration. In a closed configuration, the shells form an interior compartment. The opposing shells used herein include a front portion 4 and a rear portion 6, forming in general a parallelepiped shape defining the interior compartment for receiving items. Each of the opposing shells 4, 6 may include a major face panel 8, 10, a top end panel 12, 14, a bottom end panel 16, 18, a left side panel 20 and a right side panel 21.

The opposing shells 4, 6 may be selectively held in the closed configuration by a closure mechanism 22, such as a latch or zipper mechanism, while remaining joined together in the open configuration by a hinge that allows the opposing portions to be selectively pivoted relative to each other to open the luggage case 2. The hinge may be formed of a zipper and fabric strip, a piano hinge, discrete hinges spaced apart, or an articulating joint of metal, plastic or other suitable material. The hinge may be positioned along one of the end or the side panels. In some examples, the interior compartment of the luggage case 2 may include a single main compartment, or may be divided into one or more sub-compartments by one or more panels, dividers, zippers, and so forth. The luggage case 2 may further include one or more outer or inner pockets, and other known features.

The luggage case 2 may include one or more support elements positioned on one or more of its end, side, or face panels. The support elements may include foot support element for supporting the luggage case 2 off of the ground. The support elements may include wheel assemblies 32 for providing rolling support to the luggage case 2 for ease of translation. In some examples, the foot support elements may be configured on the side panels of the opposing portions of the luggage case 2, and a carry handle 24 may be configured on one of the opposing side panels 20, 21 for carrying the luggage case 2. The wheel assemblies, such as four spinner wheels 32, may be configured on the bottom end panels 16, 18 of the opposing portions 4, 6, and a telescoping handle 34 may be configured on one of the top end panels 12, 14, such as the rear top end panel 14, for pushing and/or pulling the luggage case 2. Apertures 26 configured to attach to a carry handle may also be positioned on the same top end panel 14 as the telescoping handle 34 or on the other top end panel 12. Additional apertures 24 may be positioned on side panel 20 and configured to attach to a carry handle.

A non-woven mat 40 may be fabricated as a single deposited layer of non-woven plastic fibers or multiple deposited layers of non-woven plastic fibers, as described below. Examples are provided to illustrate non-woven fibers deposited in a single deposited layer, which may include two different fibers (in FIG. 2A) or a bicomponent fiber (in FIG. 2B). The non-woven mat 40 made by the deposition of multiple layers of fibers is shown in FIG. 2C. Each of these examples forms an individual non-woven mat. It is contemplated that more than one non-woven mat 40 may be layered, bonded, stacked, or otherwise associated together to form a structure of multiple non-woven mats prior to being formed by the compaction, heating and molding process into a luggage shell.

Figure 7:
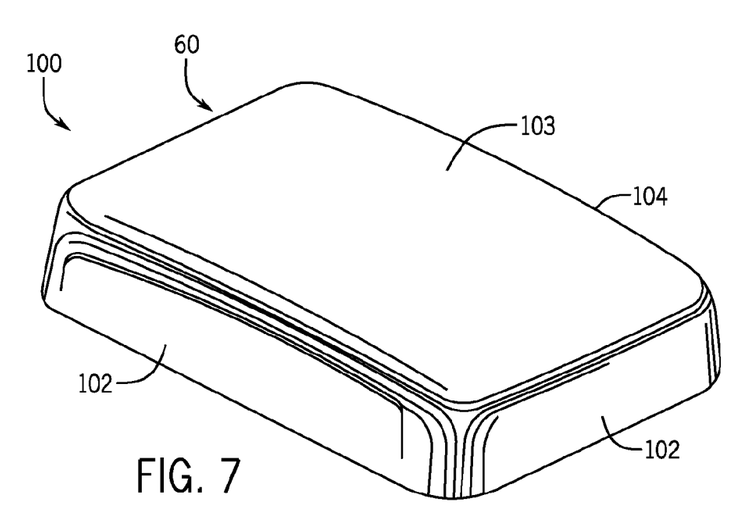
FIG. 7 is a perspective view of a luggage shell according to an example of the present disclosure.

The non-woven mat 40 may be formed into a luggage shell 60, as shown in FIGS. 1 and 7, by compaction, heating and molding. The luggage shell may be formed in a two-step process, which includes compacting the non-woven mat 40 to form a compacted non-woven sheet and then molding the compacted non-woven sheet into the luggage shell. The luggage shell may also be formed in a single combined process, which includes simultaneously compacting and molding the non-woven mat 40 into the luggage shell. Additionally, the luggage shell may be formed by combining or layering together more than one non-woven mat 40 before compacting or simultaneous compacting and molding.

Figure 2A:
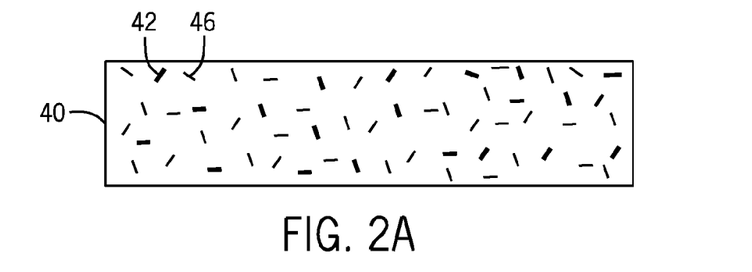
FIG. 2A is a representational cross-sectional view of the non-woven mat including two plastic fibers in a layer in accordance with embodiments of the present disclosure.

In one example, FIG. 2A shows a cross-sectional view of a non-woven mat 40 including two plastic fibers in a single deposited layer in accordance with examples of the present disclosure. The non-woven mat 40 is a single deposited layer including randomly oriented first plastic fibers 42 intermixed with randomly oriented second plastic fibers 46. The first plastic fibers 42 have a different melting point or melting temperature from the second plastic fibers 46. The fibers 42 and 46 may be discontinuous, ordered in an unaligned orientation, and substantially uniformly distributed in the non-woven mat 40.

Figure 2B:
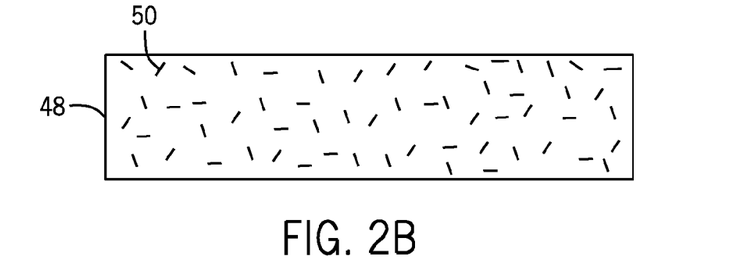
FIG. 2B is a representative cross-sectional view of the non-woven mat including a bicomponent fiber in a layer in accordance with embodiments of the present disclosure.
Figure 2C:
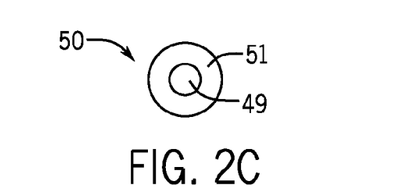
FIG. 2C is a representative cross-sectional view of the bicomponent fiber in accordance with embodiments of the present disclosure.

FIG. 2B is a cross-sectional view of the non-woven mat 48 including a bicomponent fiber in a single deposited layer in accordance with embodiments of the present disclosure. The non-woven mat 48 is a single deposited layer including bicomponent plastic fibers 50, which are randomly oriented. In some embodiments, the second portion of the bicomponent plastic fiber melts and thus becomes a matrix, while the first portion of the bicomponent plastic fiber does not melt and thus acts as the reinforcing fiber. In a particular embodiment, the bicomponent fiber 50 may include a core 49 and an outer layer 51 as shown in FIG. 2C. The outer layer 51 of the bicomponent fiber has a lower melting point than the core 49 such that the outer layer melts to join or bond the reinforcing cores together. The bicomponent fibers may also include structures, such as but not limited to a side-by-side bicomponent fiber where the first and second portions are side-by-side, or a longitudinal structure where the first and second portions are formed as different portions of the length of the fiber.

It is also contemplated that the non-woven mat having bicomponent fibers may also include discontinuous plastic fibers that are not bicomponent fibers, such plastic fibers in some instances having the same or similar melting temperature as the reinforcing fiber portion of the bicomponent fiber. The weight ratio of the additional discontinuous reinforcing plastic fibers may vary depending upon the weight ratio of the core 49 to the outer layer 51 of the bicomponent fiber 50. The total reinforcing plastic fiber percentage including bicomponent fiber and reinforcing plastic fiber may be between 30% and 80% by weight, preferably between 40% and 60% by weight. Alternatively, such plastic fibers may have the same or similar melting temperature of the matrix or melting plastic fiber portion of the bicomponent fiber. Additionally, such plastic fibers may include a mixture of reinforcing plastic fibers and melting plastic fibers.

Figure 2D:
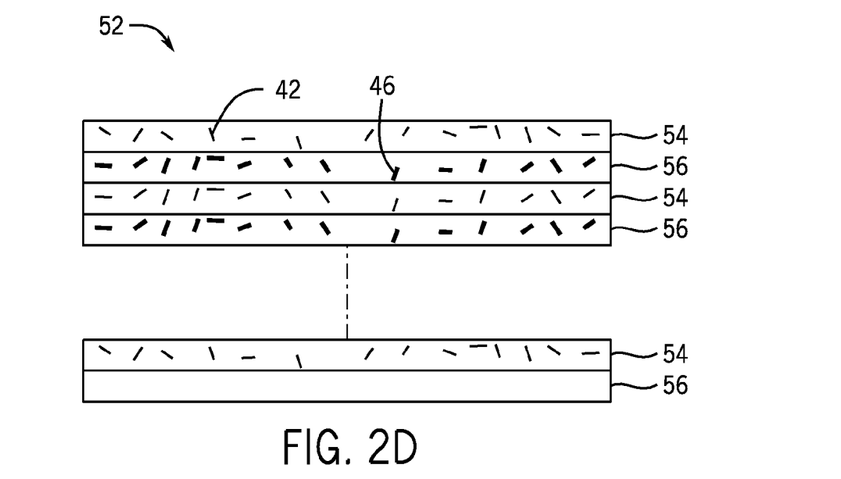
FIG. 2D is a representative cross-sectional view of a non-woven mat including two plastic fibers in multiplayers in accordance with embodiments of the present disclosure.

FIG. 2D is a cross-sectional view of a non-woven mat 52 including two plastic fibers applied or deposited in multi-layers (or also referred to as multiple regions) in accordance with examples of the present disclosure. The non-woven mat 52 includes a deposited layer or region 54 made of first plastic fibers 42, the layer 54 interleaved or alternates with a deposited layer or region 56 of a second plastic fiber 46. Each deposited layer may be very thin, and in one non-limiting example may be approximately 50 g/m², and may also be more or less or different for each layer. The fibers 42 of the first deposited layer 54 have a different melting point or melting temperature from the fibers 46 of the second deposited layer 56. Once formed, the fibers in the non-woven mat 52 having this layered structure created by this fabrication method, are interengaged and consolidated by mechanical needling, thermal bonding or chemical bonding, prior to being form into a luggage case by compaction and molding as described below. The fabrication of the non-woven mat by depositing layer upon layer may beneficially allow a more accurate and consistent composition of fibers within each layer, resulting in a better overall distribution of the desired fibers across the area and depth of the non-woven mat. The fibers in each deposited layer are discontinuous, ordered in an unaligned orientation, and substantially uniformly distributed. In this context, the terms "unaligned" or "random" both include the meaning that the fibers are laid down or applied in forming the mat in a manner so as to not be intentionally aligned in particular way relative to adjacent fibers. For example, an unaligned or random orientation is not inclusive of a woven or other intentionally geometric orientation of the fibers relative to one another. This definition, however, does not preclude the resulting orientation of the fibers being parallel, orthogonal or in a replicated angular orientation in their relative orientation. More than two layers may be utilized.

In one example, the first plastic fiber 42 is a melting fiber, while the second plastic fiber 46 is a reinforcing plastic fiber. The first plastic fiber 42 has a lower melting temperature, and can be melted to bond with the second plastic fiber 46 having a higher melting temperature. The second plastic fiber 46 does not melt at a processing temperature between the lower melting temperature and the higher melting temperature, such that the second plastic fiber 46 retains its structural properties. The first melting fiber 46 forms a matrix 61 (see FIG. 3A) in which the second reinforcing plastic fiber 46 is substantially uniformly distributed and securely bonded. In another example, the first plastic fiber 42 is a reinforcing fiber with a higher melting temperature or point, while the second plastic fiber 46 is a melting fiber with a lower melting temperature or point. The second melting fiber, in this case, forms a matrix in which the first reinforcing plastic fiber is substantially uniformly distributed.

Using the first example immediately above, the two plastic fibers are compatible such that the melting plastic fiber 42, when in matrix form, can have good adhesion to the reinforcing plastic fiber 46. The plastic fibers include, but are not limited to, poly(ethylene terephthalate) (PET), polyamide (PA), polypropylene (PP), and polyethylene (PE) among others. The reinforcing plastic fibers 46 and the melting plastic fibers 42 may be mixed substantially uniformly to form a homogeneous mixture within the deposited layer. In some embodiments, the melting plastic fiber 42 may be the same type of plastic as the reinforcing plastic fiber 46, but may have different properties, such as melting point, from the reinforcing plastic fiber 46. In some embodiments, the melting plastic fiber 42 may be a different type of plastic from the reinforcing plastic fiber 46 and may also have different properties (e.g. melting points) from the reinforcing plastic fiber 46.

One of the benefits of using two plastic fibers is that it allows flexibility in selecting two plastic fibers to meet design requirements. By using two different plastic fibers, there is also more flexibility in selecting the proportion of the reinforcing plastic fiber 46 to the melting fiber 42 and flexible adjustment in the mixing ratio of the two selected plastic fibers.

In some embodiments, the reinforcing plastic fiber may be a bicomponent plastic fiber 50, which may have at least one melting point, while the melting fiber may not be a bicomponent fiber.

In other embodiments, the melting fiber may be a bicomponent plastic fiber 50, which may also have at least one melting point different from that of the reinforcing plastic fiber, while the reinforcing fiber may not be a bicomponent fiber 50. In some embodiments, both the reinforcing plastic fiber and the melting fiber may be found together in the bicomponent fibers 50.

In one example, a bicomponent fiber 50 includes a portion 49 such as a core made of one plastic with another portion 51, such as an outer layer made of another plastic having a lower melting temperature. The plastic used in a bicomponent fiber may include, but are not limited to, poly(ethylene terephthalate) (PET), polyamide (PA), polypropylene (PP), and polyethylene (PE) among others. The plastic in the bicomponent fibers 50 may be of different types of plastic. For example, the bicomponent fiber may include PP as the outer layer and PET as the core, where PET is the reinforcing fiber. The bicomponent fiber may also include the same type of plastic, but one plastic with a lower melting temperature than another plastic. For example, the plastic may be a co-polyester, co-PET or PET. The co-PET may have a different melting point from the PET. The combinations may include PE/PP, PE/PET, co-PET/PET, or PP/PET among others.

In a bicomponent fiber 50, as noted above, in one form, the outer layer is melted to form a matrix 61 (see FIG. 3B), which embeds and bonds the core reinforcing fibers together. In a particular embodiment, the melting portion 51 of the bicomponent fiber 50 is about 25% by weight, while the core portion 49 of the bicomponent fiber is about 75% by weight. In other examples, the reinforcing portion 49 of the bicomponent fiber is preferably about 80% by weight. The ratio of the melting portion 51 of the bicomponent fiber 50 to the reinforcing portion 49 of the bicomponent fiber may vary. For example, the melting portion 51 may vary from 5% to 60% by weight with the remaining reinforcing portion 49 making up the balance. Generally, the greater weight percentage of reinforcing plastic fiber, the stiffer the resulting compacted unwoven sheet and ultimately the luggage shell component formed from that sheet.

Figure 3A:
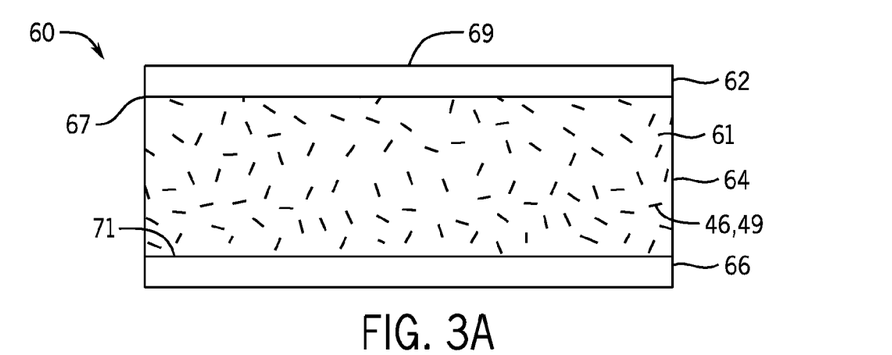
FIG. 3A is a representative cross-sectional view of a luggage shell in one embodiment taken along line A-A of FIG. 1.
Figure 3B:
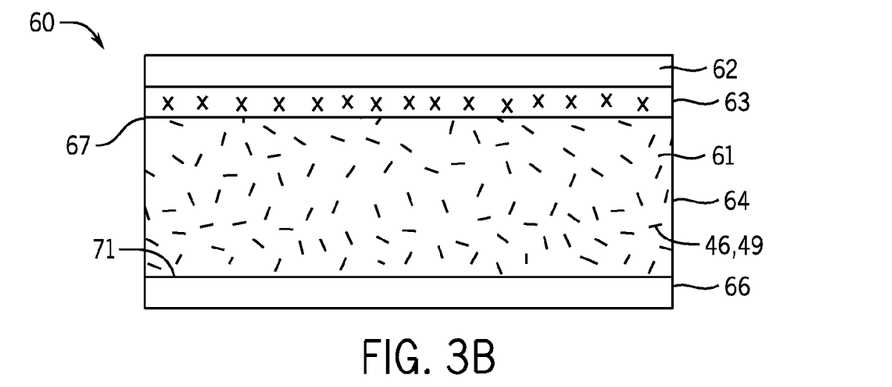
FIG. 3B is a representative cross-sectional view of a luggage shell in another embodiment taken along line A-A of FIG. 1.

There are some benefits for using the bicomponent fiber in fabricating the non-woven sheet 64 (See FIG. 3B). The bicomponent fiber may utilize the properties of two polymers to improve the non-woven material performance suitable for any specific need by tailoring one or more of the properties without substantial sacrifice of the other properties. The bicomponent fiber 50 may also have the multifunctional properties without the loss of mechanical properties. Use of bicomponent fibers may also beneficially allow a higher level of reinforcing fiber content in both the non-woven mat 48 and the compacted non-woven sheet 64, which would result in a more luggage shell having improved stiffness. In one example, use of a bicomponent fiber would allow approximately 80% reinforcing fiber content by weight, compared to formulations using separate melting plastic fibers and reinforcing plastic fiber which may generally allow approximately 40% to 60% reinforcing fiber content by weight. However, the bicomponent fiber may be relatively expensive.

In one example, the mixture of the first melting plastic fiber to the second reinforcing plastic fiber has a weight ratio R. The weight ratio R may vary from 20% to 80%, preferably from 25% to 50%. The weight ratio of the reinforcing plastic fiber and the melting or matrix plastic fiber may vary according to desired properties. For example, the melting plastic fibers may have a minimum portion to thermally bond the reinforcing plastic fibers. By increasing the reinforcing plastic fibers, the compacted non-woven sheet would have increased strength, stiffness, or less flexibility.

The fiber lengths may range from about 6.4 mm to about 250 mm. Each of the first plastic fiber and second reinforcing plastic fiber has a diameter ranging from 0.005 mm to 0.15 mm. The linear mass density of the fiber is from 1 to 300 dtex, which is the mass in grams per 10,000 meters. The area density of the deposited fiber may be between 500 g/m$^2$ and 2000 g/m$^2$. In some examples, the melting fibers and the reinforcing plastic fibers may have similar diameters or lengths. In different examples, the melting fibers and the reinforcing fibers may have different diameters or lengths. The above physical characteristics of bicomponent fibers may be the same or similar to those described above, or may vary to some extent. Fipatec® fibers, by Fiberpartner ApS of Denmark, may be non-limiting examples of fibers suitable for use in the apparatus and method presented in this disclosure, and include bicomponent polyester fibers and single component PET fibers (e.g. for use as a reinforcing plastic fiber). Additionally, IFG Exelto Staple Fibers of Belgium, may also source non-limiting examples of suitable fibers and include at least polypropylene single component fibers (e.g. for use as a melting plastic fiber). Additionally, TPC fibers, by ES Fibervisions Aps of Denmark, is a non-limiting example of suitable fibers, and include polypropylene bicomponent fibers. There may be other sources and examples of suitable plastic fibers.

The non-woven mat 40, 48 and 52 is compacted and heated to form a compacted non-woven sheet 64. A luggage shell component or composite thereof can be fabricated from the compacted non-woven sheet 64, with these two steps being performed separately or concurrently. The process will be described further herein. Additional films or layer, such as an outer film or an inner lining, may be added to the compacted non-woven sheet before or during molding.

A luggage shell may also be formed from a plurality (e.g. more than one and including several) of non-woven mats in a manner the same or similar to that used for an individual non-woven mat. For example, a first non-woven mat may be fabricated, and a second non-woven mat may be fabricated. The first and second non-woven mats may each be separately consolidated and interengaged as noted above. The first and second non-woven mats may then combined, such as by being layered, stacked, or otherwise associated together, to form a sandwich or laminate of individual non-woven mats, prior to being formed into a luggage shell configuration. The separate non-woven mats in this laminate may each have the same composition of fibers, different composition of fibers, or a combination of the same and different compositions of fibers, based on the desired end result of the shell formed therefrom. Separate non-woven mats may be used beneficially to allow for more homogeneous mixing of fibers within an individual mat; for designing layers within an individual non-woven mat to carry over to the compacted non-woven sheet, each deposited layer having a particular composition of fibers to provide different characteristics in the final luggage shell configuration; for controlling the weight of each individual mat; for expense reduction; or based on limitations related to the consolidation and interengagement of each non-woven mat.

FIG. 3A is a cross-sectional view of a luggage shell component in according to embodiments of the present disclosure. The cross-section is shown by arrows A-A in FIG. 1. A luggage shell 60 may include a film 62 on a top or an outer surface 67 of the compacted non-woven sheet 64, which may include the non-woven second fiber 46 or the core 49 of the bicomponent fiber 50 uniformly distributed or embedded in a polymer matrix 61 formed from the melted non-woven first fiber 42 or outer layer 51 of the bicomponent fiber 50.

Top film 62 may be laminated with the compacted non-woven sheet or matrix sheet 61 for various reasons, such as improving scratch resistance, visual appearance, touch aspect, or a combination thereof. The top film 62 may be made of any thermoplastic, including PET, PA, or thermoplastic polyurethane (TPU) and the like, among others. The film thickness may vary between 15 μm and 150 μm, preferably between 25 μm and 80 μm. The top film 106 may be pre-treated to have good adhesion to the outer surface 67 of the compacted non-woven sheet 64. The luggage shell 60 may also optionally include an extra lining 66 on a bottom or inner surface 71 of the luggage shell, although it is not required. The luggage shell component may, as desired, not include either a top film 62 or a lining 66.

In some embodiments, the top film may be applied after the compacted non-woven sheet is formed. For example the top film may be applied to the compacted non-woven sheet during a thermoforming/molding process.

In some embodiments, the first plastic fiber or thread, second reinforcing plastic fiber or thread, as well as the top film may be partially or completely recyclable.

FIG. 3B is a cross-sectional view of a luggage shell in another embodiment. The luggage shell made of compacted non-woven sheet 64 without the top film 62 may show orange peel or pinholes on the outer surface 67 of the compacted non-woven sheet 64. With the top film 62 pressed on top of the compacted non-woven sheet 64, the pressure is not uniform due to the non-woven sheet, such that the surface 69 of the top film 62 may show print-through from the pinholes. To reduce or eliminate the orange peel effect, the luggage shell 60 may also include a cushioning layer 63 between the top film and the compacted non-woven sheet 64. The cushioning layer 63 may be formed of a relatively soft material with a low modulus, such as a thermoplastic polyolefin (TPO) and the like.

The compacted non-woven sheet 64 may have a compacting factor ranging from approximately 70% to 100%, preferably from approximately 80% to 100%, also preferably from approximately 85% to 100%, more preferably from approximately 95% to 100%. Suitable shell components have been formed from compacted non-woven sheets having approximately an 80% compaction factor. The compacting factor provides a measure on whether the non-woven mat is completely compacted or partially compacted. When there is no space or air gap between the discontinuous fibers, the compacting factor is 100%. When there is some space or air gap between the discontinuous fibers or some fibers do not contact each other, the compacting factor is less than 100%. While generally having less air gaps within the compacted non-woven sheet may have advantages, it is not a requirement that the compaction range be close to 100%, instead a compaction range of 80% to 100% has been found to be suitable. Reference to 100% is inclusive of "about" 100% since reaching 100% compaction is difficult.

In the case of the bicomponent fiber 50, the compacting factor is the ratio of the measured density to the density of the pure polymer.

In the case of two fibers, i.e. one melting plastic fiber 42 and one reinforcing plastic fiber 46, the compacting factor may be the ratio of the measured density to the density of the mixture of the pure polymers.

The density of the compacted non-woven sheet after forming or compacting, in one example, may range from 0.9 kg/liter to 1.3 kg/liter.

The compacted non-woven sheet may have a Young's modulus ranging from 1000 N/mm$^2$ to 15,000 N/mm$^2$, preferably from 2000 N/mm$^2$ to 10,000 N/mm$^2$.

The basic steps for the fabrication of the compacted non-woven sheet, include generally mat formation, compacting, and heating to form compacted non-woven sheets.

Figure 4:
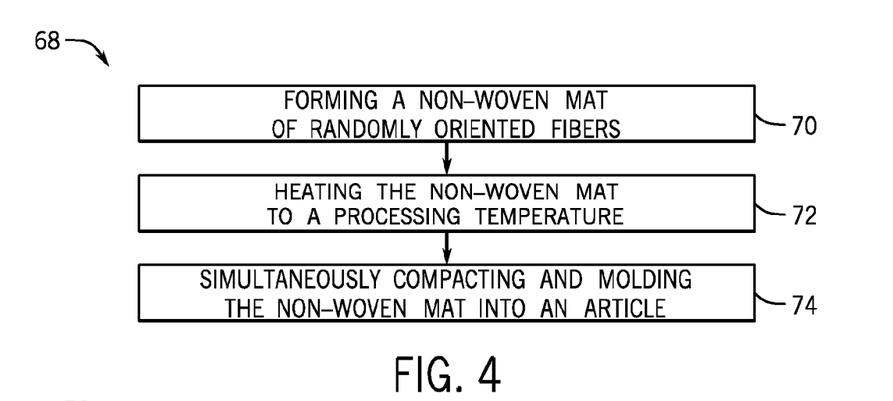
FIG. 4 is a flow chart illustrating operations for fabricating a luggage from a non-woven mat in accordance with embodiments of the present disclosure.

FIG. 4 is a flow chart illustrating operations for fabricating a luggage shell from a non-woven mat 40, 48, or 52 in according to embodiments of the present disclosure. Method 68 starts with forming a non-woven mat including randomly oriented fibers at operation 70. The non-woven mat may include two plastic fibers 42 and 46 in a single deposited layer, as illustrated in FIG. 2A. The two plastic fibers may have different melting points and be uniformly mixed in the single deposited layer. The non-woven mat may also include bicomponent fiber 50 in a single deposited layer, as illustrated in FIG. 2B. The bicomponent fiber 50 includes a plastic portion 51 having a lower melting point than another plastic portion 49. The non-woven mat may also include two plastic fibers 42 and 46 deposited in multilayers, as shown in FIG. 2C.

Method 68 also includes heating the at least one non-woven mat to a processing temperature at operation 72. In some embodiments, the processing temperature is between the melting points of the two plastic fibers 42 and 46 when the non-woven mat includes two plastic fibers. In some embodiments, the processing temperature is between melting points of the bicomponent fiber 50, when the non-woven mat includes a bicomponent fiber. If both individual reinforcing and melting plastic fibers and bicomponent plastic fibers are included in a non-woven mat, then the processing temperature will beneficially be higher than the highest melting temperature of the melting plastic fibers, and lower than the lowest temperature of the reinforcing plastic fibers. This heating step 72 may be performed in conjunction with the compacting and molding step as discussed elsewhere herein, with the heat being applied during the compacting and molding step.

Method 68 further includes simultaneously compacting and molding the at least one non-woven mat into an article, such as a luggage shell component or composite thereof, at operation 74. The benefit of this operation may include reducing the production time that is required in a two-step process as illustrated in FIG. 5 below, i.e. forming at least one compacted non-woven mat and then molding the at least one compacted non-woven mat into an article.

In this method 68, a hot compaction of the non-woven fibers, optionally including additional lining or film layers 66 or 62 respectively, may be done at the same time or simultaneously as molding or shaping to form the luggage shell component or composite.

Figure 5:
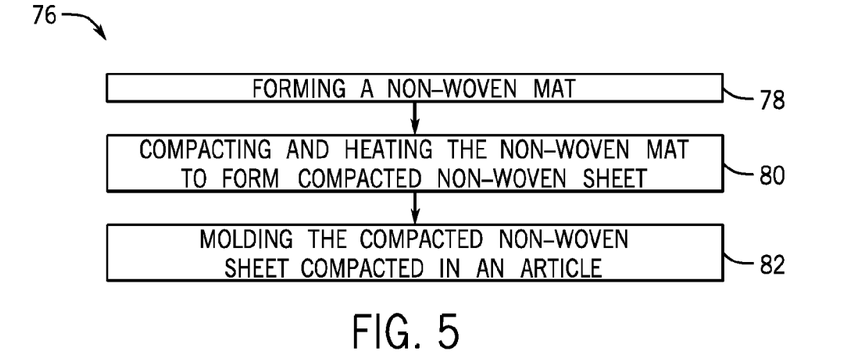
FIG. 5 is a flow chart illustrating operations for fabricating a luggage from a compacted non-woven sheet in accordance with embodiments of the present disclosure.

FIG. 5 is a flow chart illustrating operations for fabricating a luggage shell from a compacted non-woven sheet 64 in accordance with embodiments of the present disclosure. Method 76 starts with forming a non-woven mat 40, 48, or 52 at operation 78, followed by compacting and heating the non-woven mat to form a compacted non-woven sheet 64 at operation 80. Method 76 continues with molding the compacted non-woven sheet 64 into an article, such as a luggage shell component 2, at operation 82.

Figure 6:
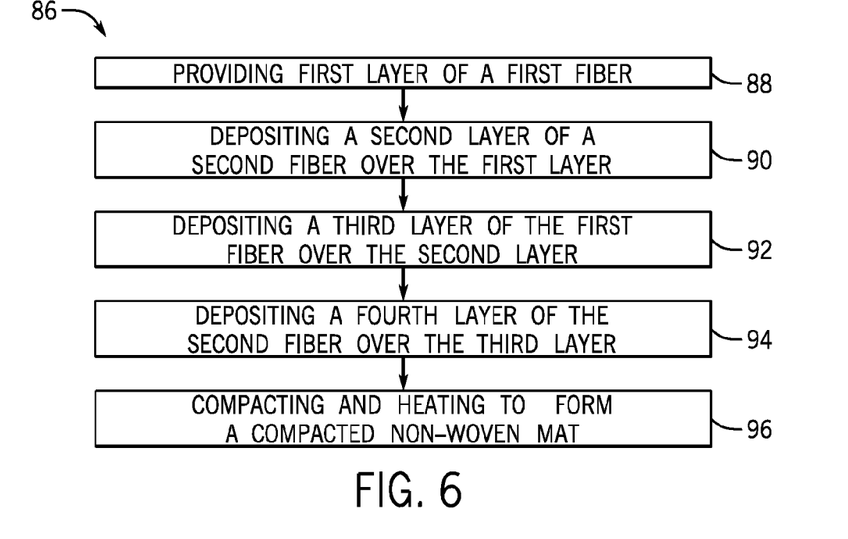
FIG. 6 is a flow chart illustrating operations for fabricating a compacted non-woven sheet in accordance with embodiments of the present disclosure.

FIG. 6 is a flow chart illustrating operations for fabricating a compacted non-woven sheet from deposited multilayers of fibers as shown in FIG. 2D in according to embodiments of the present disclosure. Method 86 starts with depositing a first layer of a first plastic fiber at operation 88, followed by depositing a second layer of a second plastic fiber over the first layer of the first plastic fiber at operation 90. Method 86 continues by depositing a third layer of the first plastic fiber over the second layer of the second plastic fiber at operation 92, followed by depositing a fourth layer of the second plastic fiber over the third layer of the first plastic fiber at operation 94 such that a non-woven mat including layers of the randomly oriented first plastic fiber interleaved with layers of the randomly oriented second plastic fiber is formed. Operation 96 includes compacting and heating the non-woven mat to form a compacted non-woven sheet. The benefit of this process may be to obtain better intermixing of the fibers or to mix the two plastic fibers uniformly and is more easily to build up an even thickness of material.

In some embodiments, the first plastic fiber may be the melting fiber and the second plastic fiber may the reinforcing plastic fiber. In alternative embodiments, the first plastic fiber may be the reinforcing plastic fiber and the second plastic fiber may the melting plastic fiber.

The difference between the first melting temperature of the reinforcing plastic fiber 46, 49 and the second melting temperature of the melting plastic fiber 42, 51 is at least 5° C. In other embodiments, this difference may vary, and be at least 15° C.; 25° C.; 35° C.; 45° C.; 55° C.; 65° C.; 75° C.; 85° C.; 95° C.; 105° C.; 115° C.; 125° C. and has been found to be acceptable up to and including 130° C.

Although the non-woven matrix 61 may be formed from powder or liquid (chemical bonding), the fiber form is better in providing substantially uniform or homogenous mixing of a melting 42, 51 or matrix plastic and a reinforcing plastic fiber 46, 49, by alternately depositing a first plastic fiber and a second plastic fiber, followed by the first plastic fiber and the second plastic fiber to form a stack of very thin interleaved fiber layers, which may be needled or meshed together, compacted, and heated. Fiber processing technology and equipment, including chopping fibers and mixing, may be used. The deposited fibers may be re-needled to intermix the two different fibers and also the deposited layers of fibers. If the melting or matrix plastic is in powder form, the mixing may not be as uniform as the melting fiber. If the matrix plastic is in liquid form, the mixing is also not as uniform as the melting fiber due to the high viscosity of the plastic.

With reference to the structures and methods described herein, where the non-woven mat is made entirely or partially of bicomponent fibers, the non-woven mat may be made by one or more deposited layers prior to compacting and heating. Alternatively, the bicomponent fibers may be formed by the deposition of more than one deposited layer of bicomponent fibers as noted herein, in part with reference to FIG. 2d. Depositing more than one layer may be beneficial by allowing tighter or improved control of the application of the fibers and allow the deposition process to be more accurate and repeatable.

Method 86 further includes compacting and heating the multilayers of fibers at operation 96 to form a compacted non-woven sheet, a web, or a matrix sheet. The compacted non-woven sheet includes at least one reinforcing plastic fiber or thread embedded in a matrix formed of one melting fiber with a lower melting temperature than that of the reinforcing plastic fiber. Alternatively, the compacted non-woven sheet includes bicomponent fibers, either in its entirety or combined with the mixture of separate reinforcing plastic fibers and melting plastic fibers, as noted above.

The fibers in a non-woven mat, before heating and compaction, are interengaged and consolidated by chemical, mechanical, or thermal bonding. Before compaction, the thickness of a mechanically-bonded (such as by needle-punching) non-woven mat, for either an integral homogeneous single deposited layer individual non-woven mat configuration (see FIG. 2A or 2B) or a multiple deposited layer non-woven mat configuration (see FIG. 2C), may vary from 1.5 mm to 10 mm, and preferably approximately 5 mm. Where such non-woven mat is thermally bonded for consolidation prior to compaction and molding, the thickness may be preferably in the range of about 20 mm to 35 mm, and more preferably in the range of approximately 25-30 mm. Thermally bonded non-woven mats may beneficially be uniformly heated more easily heated (prior to or during the subsequent luggage shell forming method) than mechanically stapled non-woven mats. The density of the individual non-woven mat including all layers before forming or compacting may be in the range of from about 0.05 kg/liter to 0.9 kg/liter.

During the compacting and heating operation 80, 96, the non-woven mat, including with the two plastic fibers or bicomponent fibers or a mixture, may be calendared such that the plastic fibers are maintained in intimate contact at an elevated temperature sufficient to melt the first melting or matrix plastic fiber or portion of a bicomponent fiber having a lower melting temperature, while the second reinforcing plastic fiber or portion of a bicomponent fiber having a higher melting temperature remains in its fiber form. After compacting and heating, the compacted sheet is cooled to form compacted non-woven sheets or matrix sheets (64). In some embodiments, during the calendaring process, a web or mat may pass between two hot rollers. At least one roller or two rollers can be heated internally. Also, one roller or two rollers may be embossed. It will be appreciated by those skilled in the art that other methods for compacting and heating may be used.

The processing temperature for the compacting and heating at operation 80, 96 is between the first melting temperature of the melting plastic fiber 42 or portion 51 of a bicomponent fiber 50 and the second melting temperature of the reinforcing plastic fiber 46 or portion 49 of a bicomponent fiber 50. In some embodiments, the processing temperature is at least 5° C. higher than the low melting point or temperature. In other embodiments, the processing temperature may vary, and be at least 10° C., 20° C., 30° C., 40° C., 50° C., 60° C., 70° C. or 80° C. higher than the low melting point or temperature.

The processing pressure for compacting and heating the non-woven mat is generally from 0 to 20 MPa, preferably from 0.5 MPa to 10 MPa, more preferably from 1.5 MPa to 5 MPa.

In some embodiments, the processing temperature is at least 5° C. lower than the high melting point or temperature. In other embodiments, the processing temperature may vary, and be at least 10° C., 20° C., 30° C., 40° C., 50° C., 60° C., 70° C. or 80° C. lower than the high melting point or temperature.

The compacted non-woven sheet 64 after compaction and heating is a single compressed or relatively solid layer of non-woven material as shown in FIGS. 3A and 3B. The compacted non-woven layer can be relatively thick, such as ranging in thickness from 0.6 to 2.0 mm, and preferably 0.6 to 1.5 mm.

Figure 3C:
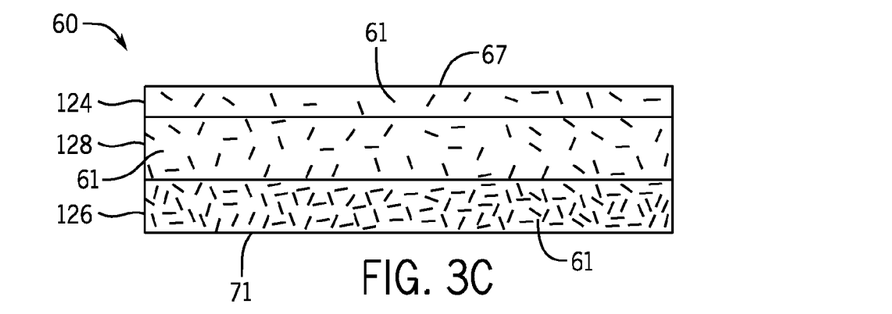
FIG. 3C is a representative cross-sectional view of a luggage shell in another embodiment taken along line A-A of FIG. 1.

With reference to at least FIG. 3C, the formation of an individual non-woven mat 40, 48, 52 by the deposition of more than one layer of fiber, whether including two different fibers 42, 46, bicomponent fibers 50, or a mixture, as noted above, allows all or some of the deposited layers to be formed of a different composition or mixture of fiber types. These different deposited layers may also be referred to as different regions in the thickness dimension of the individual non-woven mat. This structure in turn allows the physical characteristics, such as but not limited to stiffness or surface texture, of one deposited layer to differ from another deposited layer or layers having different composition of fiber types. Continuing to refer to FIG. 3C, a portion of a luggage case similar to FIGS. 3A and 3B is shown, and includes an outer layer 124 having an outer surface 67, an inner layer 126 having an inner surface 71 (a surface opposite the outer layer 67), and an intermediate layer 128. The inner and outer surfaces 71, 67, respectively, are portions of the inner and outer surfaces of the luggage shell 60. These layers and surfaces correspond to the layers and surfaces of the non-woven mat as created or fabricated, which is then compacted, heated and formed into the luggage shell 60 as described herein. The layer 124 of the non-woven mat may be deposited as a composition of fibers having a selected concentration of melting plastic (matrix 61) to result in surface 67 having acceptably smooth and/or scratch resistant characteristics. A selected concentration for this characteristic in one non-limiting example would be preferably greater than about 35% by weight, and more preferably 40% or greater by weight, of the melting plastic fiber, with other concentrations being contemplated. The inner layer 126 may be deposited as a composition of fibers having a selected concentration of melting plastic (matrix 61) to result in surface 71 having a soft texture and reduces or eliminates the need to apply a separate lining layer to the inside of a luggage case. A selected concentration for this characteristic in one example would be preferably 15% or less by weight, and more preferably 10% or less by weight, of the melting plastic fiber, with other concentrations being contemplated. The intermediate layer(s) 128 may be designed to provide desired stiffness characteristics to enhance the structural strength and resilience of the shell, with examples of suitable concentrations disclosed elsewhere herein. There may be more than one intermediate layers with the same or different composition as compared to the other layers described herein.

Additionally, the unit measure of the entirety of each of the layers, such as by weight per unit area (e.g. $g/m^2$), may be the same as or differ between adjacent or non-adjacent layers. In one non-limiting example of a non-woven mat having more than one deposited layer, such as the above example where there are included three layers or regions each with different fiber compositions, the outer layer 124 may have a measure in a range of between approximately 100-150 $g/m^2$, the inner layer 126 may have a measure in a range of between approximately 50-100 $g/m^2$, and the intermediate layer 128 may have a measure in a range of between approximately 1200 to 1700 $g/m^2$, and preferably approximately 1500 $g/m^2$. The intermediate layer 128 has a majority of the weight per unit area, effectively meaning it is a thicker or deeper layer, in order to create the desired stiffness characteristic of the compacted non-woven sheet, which provides the structural performance of the luggage case component or composite. The inner layer 126 and outer layer 124 are relatively thin compared to the intermediate area, but are sufficient to create the desired respective surface characteristics. While in this example the intermediate layer 128 has a higher measure of weight per unit area than the inner 126 and outer 124 layers, measure of the inner, outer, and intermediate (one or more than one intermediate) layers may be configured such that the outer layer 124, inner layer 126, or both may have a higher unit measure than the intermediate layer(s) 128.

Forming the non-woven mat into a luggage case shell component or shell composite may be performed in a press mold, such as a plug mold or other type of mold equipment. As noted herein, the one or more non-woven mats may molded into the desired luggage case or composite by being first compacted (as a stack if more than one non-woven mat is used) and heated prior to being placed in the press mold for shaping into the selected luggage case shell configuration. Alternatively the one or more non-woven mats may be positioned in the press mold (as a stack if more than one non-woven mat is used), heated and molded together in a unitary step into the desired form of the shell configuration. Alternatively, one or more non-woven mats may individually be compacted and heated to form a compacted sheet, and then the compacted sheets may be stacked together and placed in the press mold and molded into the desired shell configuration.

The luggage shell 60 is a laminate made of the compacted non-woven sheet or matrix sheet (64), which is or may be made of 100% non-woven material. The compacted non-woven sheet 64 or matrix sheet is or may be isotropic, including non-aligned or generally randomly oriented reinforcing plastic fiber substantially uniformly distributed in a plastic matrix.

The compacted non-woven sheet 64 may be molded to form the shell component or shell composite. Another fabric, such as a woven fabric 66, and/or film 62, may be added to the compacted sheet during the molding or during compacting of the non-woven mat prior to molding to form the shell component or composite. This fabric may be an interior lining and/or layer positioned on the outside of the luggage shell. A portion of a shell component or a shell composite may be formed by the non-woven mat as described herein. For example, a panel, corner piece, or other structural portion of a luggage case or composite may be formed by the method described herein, and used in combination with other structures to form a luggage case, such as a hybrid luggage case.

The product, such as a luggage shell, is very thin. In some embodiments, the luggage shell may have a thickness ranging from 0.4 mm to 2.0 mm, and preferably ranging from 0.5 to 1.5 mm, and more preferably ranging from 0.6 mm to 1.2 mm. Additionally or alternatively, the thickness of the shell may be in the range from about 1 mm (or 0.8 mm) to as high as 3 mm, preferably about 2.5 mm, and should normally be in the range of 1 to 2 mm. In some embodiments, the first plastic fiber or thread, second reinforcing plastic fiber or thread, as well as the top film may be partially or completely recyclable.

A luggage shell being formed from a non-woven mat as described and shown herein may beneficially have a stiffness sufficient to withstand use as a luggage case, such as for example having modulus values in a range from about 1500 to 6500 MPa, and preferably in a range of 2500 to 4000 Mpa.

In a particular embodiment, the luggage shell is formed from the compacted non-woven PET fibers. One reinforcing PET fiber has a higher melting temperature than the other melting PET fiber. For example, the reinforcing co-polyester or PET fiber may have a melting temperature about 180° C. The melting co-polyester or PET fiber has a melting temperature about 110° C. The PET fibers may be recycled fibers, which are lower in cost than newly made fibers. The processing temperature is between 110° C. and 180° C., preferably between 120° C. and 170° C., or more preferably between 130° C. and 160° C. The low melting PET may have a shorter molecular chain length than the high melting PET. The compacted non-woven thermoplastic sheet 64 as described herein and used for forming luggage shells or cases has several benefits over woven thermoplastic sheets. The compacted non-woven sheet 64 or matrix sheet does not require weaving, and may use recyclable fibers, which may significantly reduce material cost. Additionally, no tensioning is required in press forming a deep-drawn shell because no pre-stretching is needed when forming the non-woven mat. In the mat configuration prior to compaction/heating, as well as after being formed into a sheet, the non-woven fibers are in their natural fiber form and under very little or no tension, and thus do not require any stretching before press forming. In contrast, tensioning control is required for self-reinforced polypropylene (PP) fibers (SRPP). The reasons for this tensioning control are that the PP fibers are generally pre-stretched before being woven and tend to return to their original shape or natural state (at a lower level of stress) when heated during the deep-drawing process.

Another benefit of the compacted non-woven sheet over SRPP sheets is its increased stiffness. The fibers used to form the compacted non-woven sheet may use PET, which is stiffer than PP, such that the compacted non-woven matrix sheet is stiffer than the SRPP. With the increased stiffness, no or less corner reinforcement is needed, as compared to luggage shells made of woven fabrics, which do require corner reinforcement.

Additionally the inner, concave surface of a finished luggage shell may be sufficiently smooth to have a soft touch suitable to not require an inner lining be applied to this surface of the luggage shell. The surface roughness is relatively low compared to other materials formed into luggage shells. This feature is a further benefit of the compacted non-woven matrix sheet over the conventional SRPP in that the surface formed during the thermoforming step is adequate to be used as the internal surface exposed to the user, since it has a suitable surface finish and does not require a liner to cover up, as noted above.

FIG. 7 shows a shell 100 according to an embodiment of the present disclosure, in this case, a luggage shell. Here, the edge around the perimeter of the upstanding sidewalls 102 has been cut to remove the excess material, or offal, leftover from the processing. The shell is deep drawn, that is, the sidewalls 102 with respect to a base wall 103 have a depth dimension that is quite large relative to previous luggage shells made from non-woven thermoplastic sheets. More particularly, this depth dimension is quite large relative to the length or width dimension of the overall shell 100. This relationship can best be expressed as a ratio of the smaller of either the length or the width dimension. Preferably, the shell has a depth of up to half of a width dimension of the shell with a preferred ratio being in the range of about 0.2 to 0.3. Additional to the thickness dimensions set forth above for the shell 64, the homogenous thickness of the shell material preferably amounts to as low as 1 mm (or 0.8 mm) to as high as 3 mm, preferably about 2.5 mm, and should normally be in the range of 1 to 2 mm. The preferred luggage shell is made from compacted non-woven reinforcing plastic, although other thermoplastic materials having similar physical, chemical, and thermos-processing characteristics will work as well. The compacted non-woven reinforcing thermoplastic material includes randomly oriented plastic reinforcing plastic fibers in conjunction with molecularly un-oriented thermoplastic or similar matrix material.

As shown in the figures, the luggage shell's upstanding wall has a dimension perpendicular to a base wall 103 of about 110 mm for a typical 50 cm case. The ratio of length to width is preferably between 1 and 2, in particular, between 1 and 1.4. The shell has integrally formed corner regions 104. The width of the shell for such a luggage case thus would usually be around 36 cm. Such dimensions result in a shell that, when paired with a similarly proportioned shell with a simple frame or zipper closure at the mating edges, provides a remarkably light luggage case with substantial volume in which to pack a traveler's needs. The upstanding wall 6 of each such shell 100 should thus be as deep as possible. This perpendicular dimension for such a luggage case could be as little as about 80 mm and still be considered "deep drawn", especially where the radius of the self-reinforcing material in the corner region is 60 mm or less.

It will be appreciated by those skilled in the art that the luggage shell can have a range of shell sizes. The luggage shell may be deep drawn shells where the ratio of the perpendicular dimension discussed above to the smaller of the width or length dimension is preferably less than about 0.3, for shells with corner radiuses of preferably less than about 60 mm.

The non-woven reinforcing plastics have remarkable strength, resistance to impact and toughness which make them attractive for making very lightweight structures, especially deep drawn shells of the type described.

The non-woven plastic fibers are less stiff than organic fibers and their visco-elastic behavior allows for more deformation than glass-fiber or carbon-fiber reinforced composites, such that the properties of the plastic fibers can promote the deep-drawing of these materials.

Figure 8A:
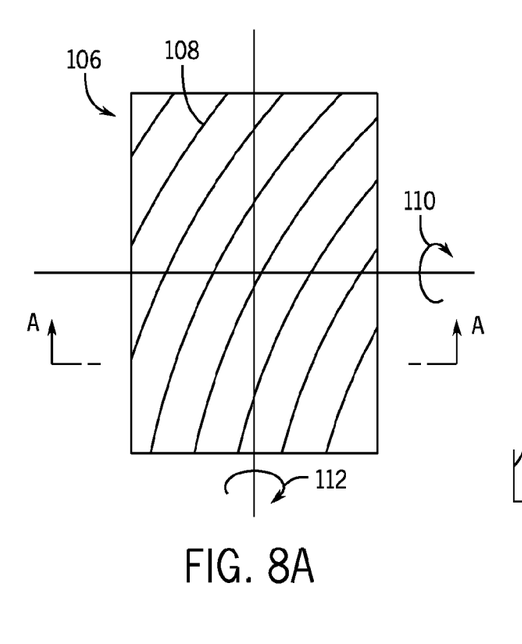
FIG. 8A is a plan view of a stiffening pattern for a base wall of a luggage shell.
Figure 8B:
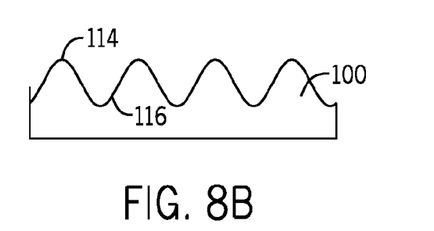
FIG. 8B is a perspective cross section scaled up to show the stiffening pattern of FIG. 8A.

FIG. 8A is a plan view of a stiffening pattern for the base wall of a luggage shell. Stiffening pattern 106 includes curves 108 formed in a wall of the luggage case during the forming step such that the base wall 103 can better withstand loads with respect axis 110 and axis 112 which is perpendicular to axis 110. FIG. 8B is a detail comparing the center line of general cross sectional shape of the base wall at section AA. The base wall 103 of the inventive shell has a pattern of alternating concave and convex areas 114, 116 (see FIG. 8B) formed in the wall 103 and extending in a curve, as noted above, relative to at least one peripheral edge of the wall 103, and particularly relative to the longer portions of the peripheral edges defining the length of the shell, to provide remarkable structural stiffening by increasing the beam strength or increasing the bending moment to resist bending in all planes perpendicular to the base wall, for example, around horizontal axis 110 and vertical axis 112. The structural stiffening pattern allows the fabrication of a thinner shell that has the impact strength and stiffness for the luggage. The stiffening pattern may also be a softer, potentially more esthetically pleasing pattern.

Figure 9:
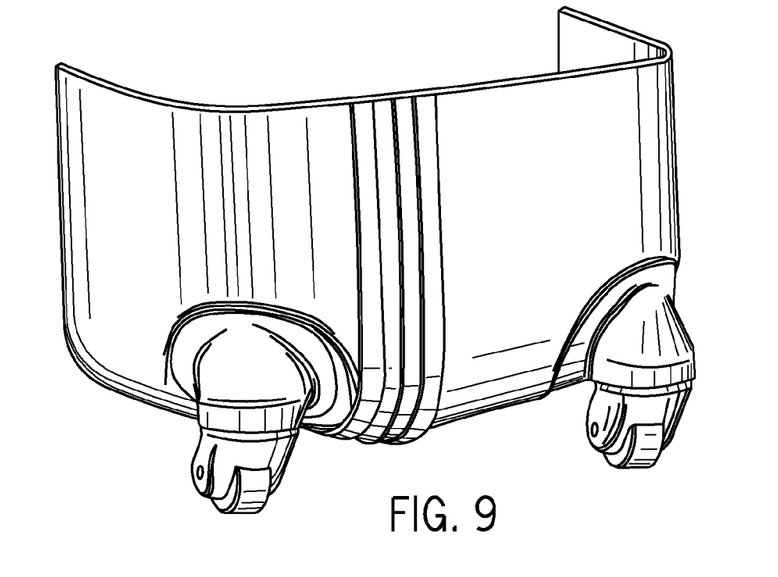
FIG. 9 is a partial perspective detail view of a lower corner of the luggage case using luggage shells according to embodiments of the present disclosure.
Figure 10:
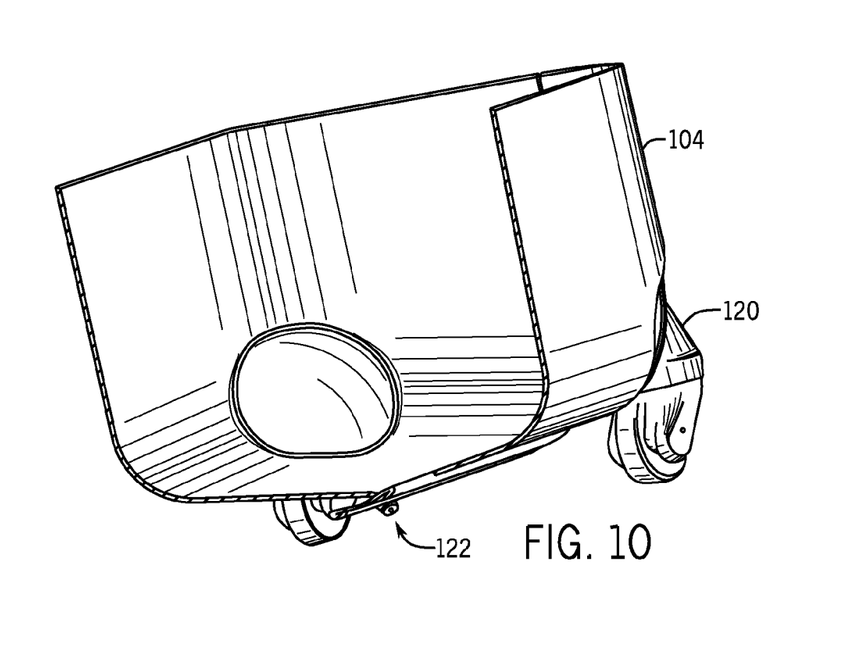
FIG. 10 shows the interior surface of portion of a luggage case shown in FIG. 9.

FIG. 9 is a partial perspective view of a luggage case using shells according to the present disclosure, being a view from the lower corner of the luggage case. FIG. 10 is a view similar to FIG. 9, but shows the interior surface of that portion of the luggage case. In one example, the shell of the compacted non-woven fibers is sufficiently strong to require no extra bracing to support the attachment of wheel assemblies, such as spinner wheel assemblies, directly to the shell 60.

Here, one can see that a luggage case can be made by mating two similarly shaped shells. The adjacent edges are selectively attached by a zipper 122 or slide opener track. Note the wheel mounts 120, such as caster wheels) are at the shell corners, in particular, at the very corners giving stability much like the casters on the ends of an office chair's legs (of course, they can also be accommodated in recessed areas). As is derivable, the shell halves can have quite different depths with the non-woven mating area offset with respect to the corner/castor positions.

The luggage case shown, even including four wheels and appropriate carry and wheeling handles, could weigh as little as 2.2. Kg for a conventional size case of about 50 cm length. Conventional machinery and tooling for thermo-forming or deep-forming can be used in fabricating the product with ease and at relatively low operation costs.

By the afore-indicated methods, an ultra-light molded component including at least in certain areas or regions an extraordinarily high degree of form change, such as a deep-drawn shell, in particular, a luggage shell, can or may be manufactured having a high depth to width/length ratio and unrivaled mechanical properties (i.e., strength, bending resistance, resistance against distortion and breakage) combined with the high dimensional and shaping accuracy and an attractive appearance.

The disclosure provides a product and process for manufacturing the same on the basis of non-woven plastic fibers by forming a non-woven mat, including a mixture of first plastic fibers having a first melting temperature and second reinforcing plastic fibers having a second melting temperature, the first melting temperature being lower than the second melting temperature, the first plastic fibers and the second reinforcing plastic fibers being randomly oriented and compacting the non-woven mat at a temperature between the first melting temperature and the second melting temperature to melt the first plastic fibers to bind the second reinforcing plastic fibers, such that the second reinforcing plastic fibers are randomly oriented in a non-woven matrix of melted first plastic.

The present invention allows the manufacturing of an ultra-light weight luggage shell on the basis of using non-woven plastic fibers. The manufacturing of the same can be done at a lower cost by using a lower cost compacted non-woven sheet, without tensioning control, without extra an inner lining, and without extra inner reinforcement due to increased stiffness compared to woven fabrics.

The present invention provides a luggage shell made from a non-woven mat. Although the non-woven sheet may be thicker and heavier than the woven fabrics sheet in forming the luggage shell, the non-woven luggage shell may not require a lining or extra reinforcement at the corners. This reduces the weight of the luggage shell, such that the non-woven luggage shell is almost as light as the luggage shell made from woven fabrics.

Preferably, the luggage shell may or may not include any frame. The luggage shell may still have sufficient strength to support wheels and/or handles such as carrying handles or pull handles.

Having described several embodiments, it will be recognized by those skilled in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Those skilled in the art will appreciate that the presently disclosed embodiments teach by way of example and not by limitation. Therefore, the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

The invention claimed is:

1. A luggage shell comprising:
   a non-woven mat including randomly oriented discontinuous reinforcing plastic fiber and randomly oriented discontinuous melting plastic fiber, the reinforcing plastic fiber having a higher melting temperature than the melting plastic fiber;

the melting plastic fiber defining a polymer matrix; and the reinforcing plastic fiber bonded by or embedded in the polymer matrix, wherein the polymer matrix is a compacted non-woven sheet formed by compaction of the non-woven mat; and the luggage shell is formed by the non-woven sheet.

2. The luggage shell of claim 1, wherein:

the non-woven mat includes at least two deposited layers, wherein a first layer includes a higher weight percentage of reinforcing plastic fiber than melting plastic fiber and a second layer includes a higher weight percentage of melting plastic fiber than reinforcing plastic fiber.

3. The luggage shell of claim 2, wherein:

the first layer is substantially entirely reinforcing plastic fiber and the second layer is substantially entirely melting plastic fiber.

4. The luggage shell of claim 2, wherein:

the first layer defines in part a portion of an inner surface of a luggage case; and the second layer defines in part a portion of an outer surface of the shell, the first layer and the second layer having different physical characteristics.

5. The luggage shell of claim 4, further comprising:

at least one intermediate layer positioned between the first layer and the second layer, the intermediate layer having a percent by weight of the melting plastic fiber different than the first or second layers.

6. The luggage shell of claim 1, wherein the polymer matrix comprises the same type of plastic as the discontinuous reinforcing plastic fiber.

7. The luggage shell of claim 1, wherein the non-woven mat is formed at least in part by bicomponent fibers, each bicomponent fiber including a portion defined by the reinforcing plastic fiber and a portion defined by the melting plastic fiber.

8. The luggage shell of claim 7, wherein the non-woven mat is formed entirely of bicomponent fibers.

9. The luggage shell of claim 7, wherein:

the non-woven mat is formed into a shell configuration by a compaction operation and a molding operation, or by a single step compaction and molding operation.

10. The luggage shell of claim 7, wherein the polymer matrix comprises the same type of plastic as the discontinuous reinforcing plastic fiber.

11. The luggage shell of claim 7, further comprising:

at least a second non-woven mat; and wherein the second non-woven mat includes randomly oriented discontinuous reinforcing plastic fiber and randomly oriented discontinuous melting plastic fiber, the reinforcing plastic fiber having a higher melting temperature than the melted plastic fiber.

12. The luggage shell of claim 7, further comprising a film on an outer surface of the luggage shell and/or a lining on an inner surface of the luggage shell.

13. The luggage shell of claim 7, wherein: the non-woven mat includes at least two deposited layers.

14. The luggage shell of claim 13, wherein:

the first deposited layer includes a higher weight percentage of reinforcing plastic fiber than melting plastic fiber and a second layer includes a higher weight percentage of melting plastic fiber than reinforcing plastic fiber.

15. A luggage shell according to claim 1, wherein the shell is frameless.

16. A luggage shell according to claim 1, wherein a portion of the shell defines undulating convex and concave areas.

17. A luggage shell according to claim 16, wherein the undulating convex and concave areas extend in a curved orientation relative to at least one peripheral edge of a wall of the shell.

18. A luggage shell according to claim 1, wherein a wheel assembly is directly attached to the shell.

19. A method of forming a luggage shell, the method comprising:

providing a non-woven mat, the non-woven mat comprising at least one deposited layer of randomly oriented discontinuous reinforcing plastic fiber having a first weight percentage and a first melting temperature, and randomly oriented discontinuous melting plastic fiber having a second weight percentage and a second melting temperature lower than the first melting temperature, the non-woven mat held together by thermal, mechanical or chemical bonding;

compacting and heating the at least one non-woven mat to form a compacted non-woven sheet and molding the compacted non-woven sheet into the luggage shell.

20. A method of fabricating a luggage shell comprising:

forming a non-woven mat comprising a mixture of randomly oriented first discontinuous plastic fibers having a first melting temperature and randomly oriented second discontinuous reinforcing plastic fibers having a second melting temperature higher than the first melting temperature;

compacting and heating the non-woven mat at a temperature between the first melting temperature and the second melting temperature to melt the first discontinuous plastic fibers to bind with the second discontinuous reinforcing plastic fibers;

forming a compacted non-woven sheet comprising the second randomly oriented discontinuous plastic fibers embedded in a polymer matrix formed from the melted first plastic fibers; and forming a luggage shell from the compacted non-woven sheet.

* * * * *